L. C. ANDERSON.
Gate.
No. 231,951.    Patented Sept. 7, 1880.
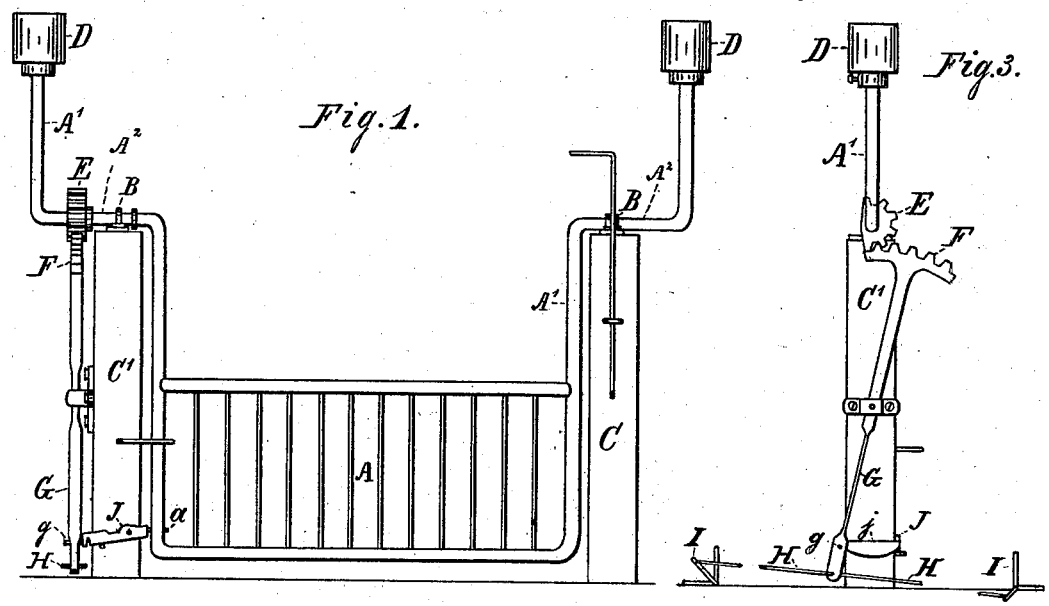
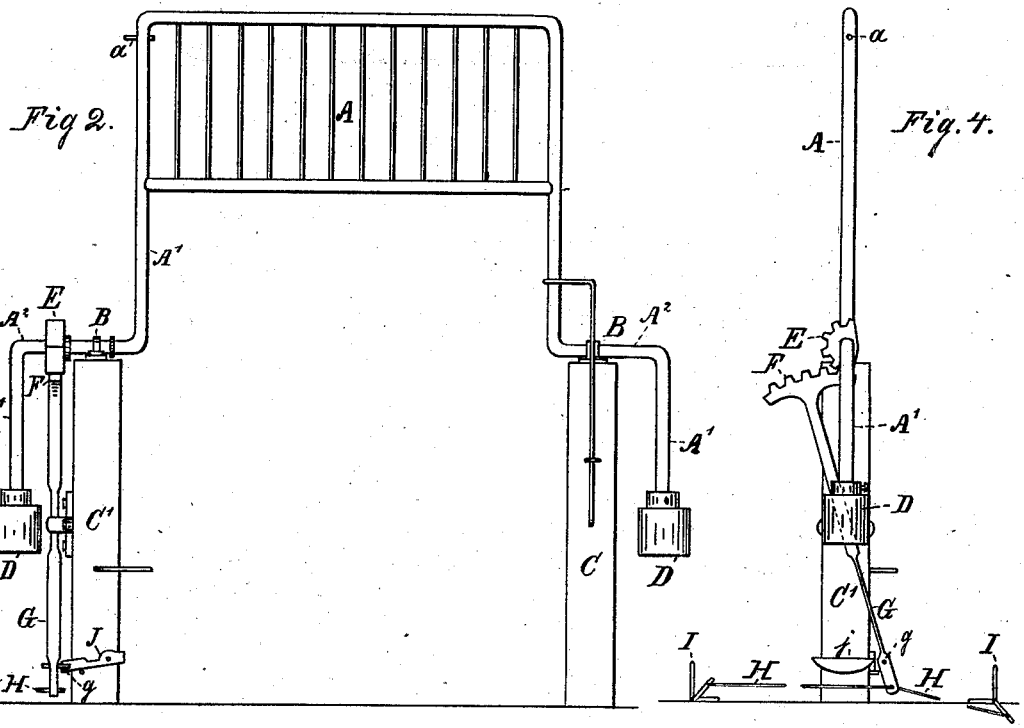
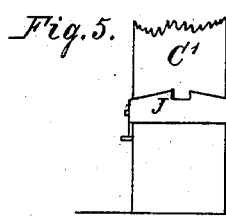
WITNESSES.
James B. Legius.
R. P. Daggett.
INVENTOR.
Leman C. Anderson,
PER
C. Bradford,
ATTORNEY.

UNITED STATES PATENT OFFICE.

LEMAN C. ANDERSON, OF ELIZABETHTOWN, INDIANA.

GATE.

SPECIFICATION forming part of Letters Patent No. 231,951, dated September 7, 1880.

Application filed September 15, 1879.

*To all whom it may concern:*

Be it known that I, LEMAN C. ANDERSON, of Elizabethtown, county of Bartholomew, and State of Indiana, have invented certain new and useful Improvements in Gates, of which the following is a specification, reference being had to the accompanying drawings, which are made part hereof, and on which similar letters of reference indicate similar parts.

Figure 1 is an elevation of a closed gate embodying my invention. Fig. 2 is a similar view, except that the gate is open. Fig. 3 is a side elevation when the gate is closed. Fig. 4 is a similar view when the gate is open. The operating mechanism is thus illustrated in both positions. Fig. 5 is a separate front view of the latch.

The gate A is hung in bearings B B upon the tops of the posts C C' in such a manner as to vibrate freely back and forth when not fastened. Its end bars, A' A', are extended upwardly beyond the bearings, and terminate in weights D D, which serve to counterbalance the gate, and thus relieve the mechanism from a large part of the strain which would be otherwise incident to operating it. Said end bars and weights are attached to the outer ends of the horizontal parts, as shown, so as to not obstruct the passage-way when the gate is open.

Upon one of the horizontal shafts $A^2$ $A^2$, which rest in the bearings B B, (and which may either form a part of the bars A' A', as shown, or be attached to one side of them,) is a spur-pinion, E, which engages with a segmental rack-bar, F, upon the top of the vertical lever G, which connects in turn with the draw-rods H, which are attached to ordinary bent levers I, over which the vehicle passes, and thus operates the mechanism to open and close the gate.

A latch, J, is pivoted to the gate-post C', and serves to engage the catch $a$ as the gate descends, and thereby hold the latter in its closed position. This latch has a rocker-like part, $j$, extending around on the opposite side of the post from the gate, under which a pin, $g$, passes as the lever G moves to and fro and operates to raise said part $j$ and thus unlatch the gate.

The lower half of the lever G consists of a spring-bar, which permits the lower end thereof to travel far enough to unlatch the gate before the gate itself shall necessarily move. It also lessens the striking force of the gate against its stops in opening or closing, by reason of the elasticity of movement imparted thereby.

I usually make the posts C C' about eight feet in height, and the gate itself about four feet. When the gate is up, if constructed as shown in the drawings, these dimensions will give a clear space underneath of about twelve feet, which is ample for all ordinary purposes.

There are several ways to connect the rods H to the horizontal shaft upon which the gate is hung as substitutes for the vertical lever G. Among the most obvious of these would be the employment of chain-pulleys and a chain in the form of a belt in connection therewith. I do not, therefore, desire to confine myself, in making this connection, to the form shown, but may employ others, if thought desirable.

Having thus fully described my said invention, what I claim as new, and desire to secure by Letters Patent, is—

1. A gate, A, hung in horizontal bearings B B, and having counterbalancing-weights D D, said weights being arranged to swing upon the opposite side of the posts from said gate, so that the space between said posts may be entirely clear when the gate is open, all substantially as shown and specified.

2. The combination, with a gate hung on horizontal bearings and having a pinion, E, properly secured thereto, of a vertical lever, G, consisting in part of a spring-bar, and having a segmental rack-bar, F, all substantially as herein shown and described, and for the purpose specified.

3. In combination with the tilting latch J, having the rocker-like part $j$, the lever G, having the projecting pin $g$, whereby the moving of said lever serves to unlatch said latch, substantially as shown and specified.

4. The combination of the bent levers I, draw-rods H, vertical lever G, consisting in part of a spring-bar, toothed segment, F, pinion E, and gate A, said gate being hung in horizontal bearings, all substantially as shown and specified.

In witness whereof I have hereunto set my hand and seal at Indianapolis, Indiana, this 9th day of September, A. D. 1879.

LEMAN C. ANDERSON. [L. S.]

In presence of—
C. BRADFORD,
GEO. W. DU BOIS.